United States Patent [19]

Bäbler et al.

[11] Patent Number: 5,095,056
[45] Date of Patent: Mar. 10, 1992

[54] 2,9-DICHLOROQUINACRIDONE-PIGMENTED ENGINEERING PLASTICS AND COATINGS

[75] Inventors: Fridolin Bäbler, Hockessin; Edward E. Jaffe, Wilmington, both of Del.

[73] Assignee: Ciba-Ceigy Corporation, Ardsley, N.Y.

[21] Appl. No.: 641,033

[22] Filed: Jan. 14, 1991

[51] Int. Cl.$^5$ ............................................. C08K 5/3432
[52] U.S. Cl. ........................................ 524/90; 546/56
[58] Field of Search ............................. 524/90; 546/56

[56] References Cited

U.S. PATENT DOCUMENTS 3,157,659 11/1964 Deuschel et al. ..................... 524/90

Primary Examiner—Paul R. Michl
Assistant Examiner—Tae H. Yoon
Attorney, Agent, or Firm—Harry Falber

[57] ABSTRACT

The use of 2,9-dichloroquinacridone having a surface area below 30 m$^2$/g as a pigment in engineering plastics and coating wherein said pigment exhibits outstanding heat stability and a unique red color in the resulting pigmented system.

14 Claims, No Drawings

2,9-DICHLOROQUINACRIDONE-PIGMENTED ENGINEERING PLASTICS AND COATINGS

Quinacridones, also referred to as 7,14-dioxo-5,7,12,14-tetrahydroquinolone-(2,3-b)-acridones are valuable pigments. Many patents and publications describe the preparation of quinacridones and quinacridone derivatives, including special transparent or opaque quinacridone pigment forms with particle sizes below 1 μm.

This series of pigments includes linear 2,9-dichloroquinacridone of the following formula which possesses unique pigmentary properties.

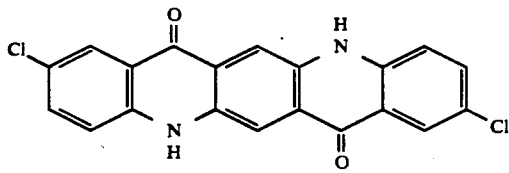

Such 2,9-dichloroquinacridones have filled a significant need by being available for the coloring of high temperature plastics and polymers. It has, however, been required to further process the crude 2,9-dichloroquinacridone resulting from the synthetic reaction in order to obtain the product in pigmentary form. This required processing stems from the fact that the particle size of organic pigments are below a certain limit, i.e. usually below about 1.0 μm, in order that the pigment meet coloristic requirements. The crude product usually does not meet this requirement.

Such processing is described, for example, in U.S. Pat. No. 4,015,998 which discloses a pigmentary, heat stable form of 2,9-dichloroquinacridone and its particular utility in combination with 50 to 97% by weight of Molybdate Orange. U.S. Pat. No. 3,157,659 describes the preparation of α,β and γ2,9-dichloroquinacridone in the presence of sulfuric acid.

Additionally, U.S. Pat. No. 4,895,949 discloses a process for preparing pigmentary solid solutions of at least one quinacridone derivative and the parent quinacridone by milling the starting quinacridone materials at ambient or near ambient temperatures in the presence of an alcohol and a base.

German patent 2753357 describes a conversion process of preground 2,9-dichloroquinacridone into a pigmentary form by contacting it with an aqueous alkaline medium of 85° C. in the presence of surfactant(s).

While these procedures have provided pigmentary qualities, particularly in high temperature plastics, the performance characteristics of the resulting pigments have varied depending on the particular application. Additionally, since these procedures generally comprise operations with multiple steps, simpler, more economical approaches are desirable. A further requirement relates to the often observed insufficient heat stability of organic pigments. Accordingly, organic pigments displaying improved heat stability are highly desirable.

It has now been surprisingly discovered that crude 2,9-dichloroquinacridone having a relatively large pigment particle size with a specific surface area of below 30 m²/g, preferably between 4-25 m²/g, and most preferably between 4-20 m²/g, demonstrates outstanding heat stability when utilized in high molecular weight organic materials, i.e. engineering plastics. A further characteristic of such pigments is their redder color shade in comparison to the known magenta shade of small particle size 2,9-dichloroquinacridone. Thus, these benefits are obtained by incorporating the specified crude pigment form of 2,9-dichloroquinacridone into high molecular weight organic materials, and in particular high performance thermoplastics, during the processing thereof.

The heat stable 2,9-dichloroquinacridone can be prepared by synthesizing 2,9-dichloroquinacridone by well known processes such as described in the U.S. Pat. Nos. 2,816,114 and 3,342,823. The last synthesis step in these procedures involves oxidation of 2,9-dichloro-6,13-dihydroquinacridone to 2,9-dichloroquinacridone in a methanol/base system. Alternatively, 2,9-dichloroquinacridone in large particle size can be obtained by cyclization of 2,5-di(p-chloroanilino)terephthalic acid in polyphosphoric acid followed by particle size ripening. The crude product can then be utilized for purposes of this invention directly or by subjecting it to conditioning to form a pigment of even lower surface area.

The optional conditioning proceeds by suspending the crude 2,9-dichloroquinacridone in a polar solvent by heating the mixture to temperatures above 50° C., preferably 100°-200° C., until the conditioning is completed, usually 1 to 24 hours depending on the chosen conditions. The conditioning can be conducted under pressure, although conditioning at atmospheric pressure is preferred.

Suitable polar solvents include aliphatic and aromatic $C_1$- to $C_8$-alcohols; aliphatic diols such as hexanediol-1,2 or propylene glycol; cyclic alcohols such as cyclohexanol or tetrahydrofurfuryl alcohol; esters such as dibutyl succinate or methyl benzoate; dimethylsulfoxide; tetramethylsulfone; glacial acetic acid; ketones such as cyclohexanone; ethers such as ethylene glycol dimethyl-ether, butoxyethanol, diphenyl ether or anisole; aromatic hydrocarbons such as nitrobenzene; N-methylformamide; N,N,N',N'-tetramethylurea, N,N-dimethyl acetamide; N,N-dimethylformamide or N-methylpyrrolidone. Preferred polar solvents are the alcohols; aliphatic diols such as propylene glycol; N-methylpyrrolidone; N,N-dimethylformamide; and dimethylsulfoxide.

The presence of water during the conditioning to the large particle size 2,9-dichloroquinacridone can be tolerated in amounts that do not impair the process. The polar solvent is present in an amount of 3 to 20 parts, preferably 7 to 14 parts, by weight, per part of pigment.

When the synthesis or optional conditioning step is completed, the pigment is isolated by filtration, the presscake is washed with a solvent and/or water and dried. The pigment can be in α or γ crystal form or a mixture of α and/or β and/or γ-2,9-dichloroquinacridone, preferably a γ-2,9-dichloroquinacridone or a mixture of α and γ2,9-dichloroquinacridone pigment having a surface area of below 30 m²/g, preferably 4-25 m²/g, and most preferably 4-20 m²/g.

A further optional treatment by way of improving the pigment involves incorporation of texture improving agents fatty acids having at least 12 carbon atoms, amides, esters or salts thereof such as stearic acid, or behenic acid; laurylamine, stearylamine, aliphatic 1,2-diols, epoxidized soya bean oil, waxes, resin acids or resin acid salts. These additives can be incorporated in amounts of 0.05 to 20%, preferably 1 to 10%, by weight, based on pigment.

The large particle size pigment is highly suitable for coloring high molecular weight organic materials. In comparison to the known γ-crystal modification of small particle size 2,9-dichloroquinacridone having a surface area of above 30 m$^2$/g which has a magenta color, the γ-crystal modification of the pigment formed according to the invention has a surprisingly attractive red color tone and manifests outstanding heat stability in the final pigmented system.

The heat stable pigment form, according to the invention, is suitable for coloring high molecular weight organic materials which are preferably high shear processed to calendered, cast and molded articles, and the like.

Based on the high molecular weight organic material to be pigmented, the new heat stable pigment form, according to the invention, can be used in an amount of 0.01 to 30% by weight, preferably 0.1 to 10% by weight.

The high molecular weight organic substances are pigmented with the new heat stable pigment form according to the invention for example by mixing such a new heat stable pigment form, if desired in the form of a master batch, into these substrates using high shear techniques including roll mills or a mixing or grinding apparatus. The combination of organic substance and pigment prior to any processing is viewed as a novel pre-mix. The pigmented material is then brought into the desired final form by methods known as calendering, pressing, extruding, brushing, casting or injection molding. By molded articles are meant in particular those obtained by orientating stress, for example molding and casing, ribbons of fibers and rolled sheets.

Thermoplastics, thermoset plastics or elastomers which can be pigmented according to invention include, for example, cellulose ethers; cellulose esters such as ethyl cellulose; linear or crosslinked polyurethanes; linear, crosslinked or unsaturated polyesters; polycarbonates, polyolefins such as polyethylene, polypropylene, polybutylene or poly-4-methylpent-1-ene; polystyrene; polysulfones; polyamides, polycycloamides, polyimides, polyethers, polyether ketones such as polyphenylene oxides, and also poly-p-xylylene, polyvinyl halides such as polyvinyl chloride, polyvinylidene chloride or fluoride, polytetrafluoroethylene, polyacrylonitrile, acrylic polymers, polyacrylates, polymethacrylates, rubber, silicone polymers, phenol/formaldehyde resins, melamine/formaldehyde resins, urea/formaldehyde resins, epoxy resins, styrene butadiene rubber, acrylonitrile-butadiene rubber or chloroprene rubber, singly or in mixtures.

Non-rigid moldings can be produced or polymer brittleness can be reduced by incorporating plasticizers into the high molecular weight compounds before the shaping operation. Suitable plasticizers include, for example, esters of phosphoric acid, phthalic acid or sebacic acid. Plasticizers can be incorporated into the polymers either before or after the incorporation of the heat stable pigment of the invention.

Whereas many organic pigments demonstrate insufficient heat stability when applied in high performance thermoplastics due to partial solubility of the pigment at high temperatures, thereby producing fluorescence when the colored parts are exposed to UV light, colored parts containing the 2,9-dichloroquinacridone prepared according to the present invention are substantially fluorescence free and consequently manifest outstanding heat stability. Thus, dulling or change of color, and the like, stemming from exposure to elevated temperatures are substantially eliminated.

Manifestly pure, high chroma-useful new color shades can be obtained with the new pigment form according to the invention in admixture with other organic and/or inorganic pigments and/or polymer soluble dyes. Furthermore, the pigments can be readily incorporated into the organic matrixes providing homogenous colorations of high opacity, saturation and excellent light and weatherfastness properties.

Coating compositions demanding high opacity which are subjected to adequate shear during processing can also be formulated with such pigments. Examples are heat-curable coatings, air drying or physically drying coatings or cross-linking chemically reactive coatings, especially stoving finishes which contain the customary binders which are reactive at high temperature, for example those selected from the group consisting of acrylic, alkyd, epoxy, phenolic, melamine, urea, polyester, polyurethane, blocked isocyanate, benzoguanamine or cellulose ester resins, or combinations thereof. The pigment can be used in coatings conventionally employed in the automobile industry, especially in acrylic/melamine resin, alkyd/melamine resin or thermoplastic acrylic or thermosetting acrylic resin systems, as well as in aqueous based coating systems.

The following examples further describe the embodiments of the instant invention. In these examples all parts given are by weight unless otherwise indicated.

EXAMPLE 1A

Preparation of 2,9-dichloroquinacridone

The compound 2,9-dichloroquinacridone is prepared according to the procedure of Example II of U.S. Pat. No. 2,821,529 with the exception that p-chloroaniline is used instead of meta-chloroaniline. Oxidation of the dihydro compound is also effected by the same general procedure described in the example, namely, 240 grams of the 2,9-dichloro-6,13-dihydroquinacridone, 960 grams of methanol and a solution of 480 grams of potassium hydroxide in 420 grams of water is placed in a vessel equipped with agitator and a reflux condenser. After stirring for 45 minutes at 50°-60° C., 180 grams of sodium-m-nitrobenzenesulfonate and 180 grams water are added. The mixture is heated at reflux until complete oxidation and an isolated sample shows an average pigment particle size of about 0.1-5 μm. Thereafter, 250 grams of water are added and the solid is separated by filtration followed by washing with water until the pigment is alkali free. The presscake is dried in a oven at 80° C., yielding 228 g grams of conditioned 2,9-dichloroquinacridone pigment having a specific surface area of 18 m$^2$/g determined by the BET-method. The X-Ray diffraction pattern identifies a mixture of α and γ2,9-dichloroquinacridones.

When incorporated into high density polyethylene by an extrusion technique at a pigment concentration of 0.5%, by weight, the pigment imparts a red color with excellent fastness properties.

EXAMPLE 1B

A 2 liter flask equipped with a thermometer, stirrer and condenser is charged with 200 g polyphosphoric acid which is heated to 70° C. Thereafter, 40 g of 2,5-di-(p-chloranilino)terephthalic acid is added, the mixture is heated to 145°-150° C. and held at this temperature for 2 hours. 34.9 g water are slowly dropped into the mixture at 130° C. (to 90% $H_3PO_4$) and held for two additional hours at 145°-150° C. With the mixture at 140° C., 350 ml water is added over a 30 minute period with the mixture being maintained at 90°-95° C. for an additional 30 minutes. The reaction slurry is filtered, the presscake reslurried in 400 ml water and the pH adjusted to 12.0 by the addition of 50% aqueous sodium hydroxide solution. The pigment suspension is stirred for 30 minutes at 90° C. and filtered. The presscake is washed base free with water and dried yielding 35.62 g of 2,9-dichloroquinacridone pigment manifesting a specific surface area of 28.5 $m^2/g$.

When incorporated into high density polyethylene, the pigment demonstrates excellent fastness to light, heat and weathering.

EXAMPLE 2

A one liter flask equipped with thermometer, stirrer and condenser is charged with 400 ml N-methylpyrrolidone and 450 g 2,9-dichloroquinacridone crude. The suspension is heated to 160° C. and stirred at that temperature for 8 hours. The pigment suspension is cooled to 40° C. and filtered. The presscake is washed with methanol followed by water and dried at 100° C., affording 444 g conditioned 2,9-dichloroquinacridone having a specific surface area of 9.8 $m^2/g$ (determined by the known BET-method).

Excellent heat stability is observed when the pigment is incorporated into polycarbonate by a molding technique at a 0.5% pigment concentration.

The X-ray diffraction pattern of the above described heat stable 2,9-dichloroquinacridone is recorded on film to determine the interplanar spacing (d-values) and the double glacing angles. Transmission recording is done with a Guinier Camera (Enraf Nonius FR 522$^R$) and Cu-k-alpha-1-radiation (wavelength=1.54050 angstrom). Quartz is used as the calibration substance with the d-values taken from powder diffraction file.

The d-values of most reflections together with the relative line intensities estimated visually as well as the compounding double glancing angles are noted in the following table, thus showing the product to be the gamma form of 2,9-dichloroquinacridone.

| interplanar spacings | | double glancing angles |
|---|---|---|
| d-value in angstrom | intensity | °2θ |
| 16.9 | strong | 5.2 |
| 5.84 | very strong | 15.2 |
| 5.38 | strong | 16.2 |
| 4.62 | medium | 19.2 |
| 3.88 | medium | 22.9 |
| 3.82 | very strong | 23.3 |
| 3.65 | medium | 24.4 |
| 3.35 | medium | 26.6 |
| 3.23 | medium | 27.6 |
| 3.20 | very strong | 22.9 |
| 3.08 | strong | 29.0 |
| 2.91 | very strong | 30.7 |
| 2.29 | strong | 39.4 |
| 2.22 | weak | 39.6 |
| 2.23 | medium | 40.4 |
| 1.83 | medium | 49.8 |
| 1.81 | medium | 50.3 |
| 1.61 | weak | 57.0 |
| 1.60 | medium | 57.6 |

EXAMPLE 3

A one liter flask equipped with thermometer, stirrer and condenser is charged with 400 ml N,N-dimethylformamide and 400 g 2,9-dichloroquinacridone crude. The suspension is heated to reflux and stirred at reflux temperature for 7½ hours. The pigment suspension is cooled to 40° C. and filtered. The presscake is then washed with methanol followed by water and dried at 100° C., affording 396 g conditioned 2,9-dichloroquinacridone. The pigment has a specific surface area of 9.7 $m^2/g$ and shows excellent heat stability when incorporated into high performance plastics as in Examples 1 and 2.

EXAMPLE 4

The procedure of Example 3 can be repeated using anisol as the solvent and with stirring being continued for 7 hours at 170° C. to obtain a 2,9-dichloroquinacridone with similar desirable properties.

EXAMPLE 5

The procedure of Example 3 can be repeated using propylene glycol as the solvent and with stirring being continued for 6 hours at 170°-175° C. to yield a 2,9-dichloroquinacridone of comparably good fastness properties.

EXAMPLE 6

The procedure of Example 3 can be repeated using tert.-amyl alcohol as the solvent and with continued stirring for 8 hours at 145°-155° C. in an autoclave under pressure to yield a 2,9-dichloroquinacridone of comparably good fastness properties.

EXAMPLE 7

63.0 Grams of polyvinylchloride, 3.0 grams epoxidized soya bean oil, 2.0 grams of barium/cadmium heat stabilizer, 32.0 grams dioctyl phthalate and 1.0 gram of the 2,9-dichloroquinacridone prepared according to Example 1 are mixed together in a glass beaker using a stirring rod.

The mixture is formed into a soft PVC sheet with a thickness of 0.4 mm by rolling for 8 minutes on a two-roll laboratory mill at a temperature of 160° C., a roller speed of 25 rpm and friction of 1:1.2 by constant folding, removal and feeding. The resulting soft PVC sheet is colored in a tinctorially strong red shade with excellent fastness to heat, light and migration.

EXAMPLE 8

5 g 2,9-dichloroquinacridone pigment obtained in Example 3, 2.5 g CHIMASORB 944 LD (hindered amine light stabilizer), 1.0 g TINUVIN 328 (benzotriazole UV absorber), 1.0 g IRGANOX 1010 (hindered phenol antioxidant) and 1.0 g IRGAFOS 168 (phosphite process stabilizer) (all additives from CIBA-GEIGY Corp.) are mixed in a BANBURY mixer together with 1000 g high density polyethylene at a speed of 175-200 rpm and a total residence time of approximately three minutes. The fluxed pigmented resin is chopped up while warm and maleable, and then fed through a granulator. The resulting granules are molded on a BATTENFELD 1000 injection molder with a 5 minute dwell time and a 30-second cycle time at temperatures of 205° C., 260° C. and 315° C., respectively.

For comparison purposes, a commercial small particle size 2,9-dichloroquinacridone pigment (MONASTRAL Magenta RT-235-D from CIBA-GEIGY Corp.)

having a specific surface area of 67 m²/g is incorporated into high density polyethylene in a similar manner as described above.

A color spectrophotometer with D-65 illuminant, C.I.E. lab scale and 10 degree observer with specular component included is used to measure the L, A, B color space values of chips at 205° C. In addition, the total color difference values (DELTA E) of chips molded at 260° C. and 315° C. are measured versus chips molded at 205° C. The values are noted in the following table.

| Pigment | Chips at 205° C. | | | Delta E vs. chip molded at 205° C. | |
|---|---|---|---|---|---|
| | L | A | B | 260° C. | 315° C. |
| large particle size 2,9-dichloro-QA (obtained in Example 3) | 36.8 | 38.9 | 12.3 | 1.1 | 1.3 |
| MONASTRAL Magenta RT-235-D | 30.6 | 26.5 | 4.6 | 1.1 | 4.9 |

The L, A, B color space values demonstrate the substantial change in color of the large particle size pigment as compared to the small particle size commercial product, while the superior heat stability of the large particle size pigment prepared according to the present invention is reflected by the Delta E values.

EXAMPLE 9

A one gallon wide mouth plastic container is charged with 1000 g polycarbonate (LEXAN from General Electric), 1.0 g IRGAFOS 168, 3.0 g TINUVIN 329 and 1.0 g IRGANOX 1076 (all additives from CIBA-GEIGY Corp.) and 2.5 g 2,9-dichloroquinacridone obtained according to Example 2. The mixture is shaken on a paint shaker for 3 minutes, dried in a vacuum oven for 5 hours at 160° C. and molded on a BATTENFELD 1000 injection molder. Dwelltime is 5 minutes. The cycle is 30 seconds at temperatures of 260° C. and 315° C. For comparison purposes, the commercial small particle size 2,9-dichloroquinacridone MONASTRAL Magenta RT-235-D is incorporated into polycarbonate in a similar manner and again the L, A, B color space values of the chips at 260° C. are measured as well as the total color difference values (DELTA E) of the chips molded at 315° C. versus 260° C.

| Pigment | Chips at 205° C. | | | Delta E vs. chip molded at 260° C. |
|---|---|---|---|---|
| | L | A | B | 315° C. |
| large particle size 2,9-dichloroquinacridone (obtained in Example 2) | 38.1 | 34.9 | 10.8 | 1.1 |
| MONASTRAL Magenta RT-235-D | 32.8 | 21.1 | 4.4 | 4.2 |

The large particle size 2,9-dichloroquinacridone prepared according to the present invention demonstrates a change in hue (in comparison to the commercial pigment) as well as excellent heat stability when incorporated into the polar engineering plastic polycarbonate.

EXAMPLE 10

A mixture of 100 g polyethylene terephthalate granules and 0.1 g of pigment obtained according to anyone of Examples 1 to 6 can be blended for 15 minutes in a glass bottle on a roller gear bed. Extrusion of the mixture into a ribbon in a laboratory extruder will produce a ribbon colored in a uniform strong red color of excellent light and heat fastness.

EXAMPLE 11

The procedure described in Example 10 can be repeated using APILON 52-651 polyurethane (AP1 spc Mussolente, Italy) to yield a strongly red shade-colored polyurethane ribbon having excellent lightfastness.

EXAMPLE 12

The procedure of Example 10 can be repeated using ULTRANYL KR 4510 polyphenylene ether/polyamide blend (BASF) to yield a ribbon having a uniform strong red color of excellent fastness properties.

EXAMPLE 13

The procedure of Example 10 can be repeated using DEGALAN G7 polymethylmethacrylate granules (BAYER) to yield ribbon having a strong red shade of excellent fastness properties.

EXAMPLE 14

The procedure of Example 8 can be repeated using CYCOLAC T-1000 acrylonitrile-butadiene-styrene granules (GENERAL ELECTRIC) as substrate to yield red colored chips exhibiting excellent heat and lightfastness properties.

EXAMPLE 15

The procedure of Example 8 can be repeated using MOPLEN S50G polypropylene granules (MONTEDISON) as substrate to yield red colored chips which show excellent heat and lightfastness properties.

EXAMPLE 16

The procedure of Example 8 can be repeated using VESTAMID polyamide granules (HUELS) to yield red colored chips showing excellent heat and lightfastness properties.

EXAMPLE 17

Six grams of the large particle size 2,9-dichloroquinacridone prepared according to Example 2 can be stirred into 20 grams of a mixture of the following composition: 50 grams of a mixture of aromatic hydrocarbons (SOLVESSO 150-ESSO), 15 grams of butylacetate, 5 grams of ketoxime-based leveling agent, 25 grams of methyl isobutyl ketone and 5 grams of silicone oil (1% SOLVESSO 150). Upon complete dispersion, 48.3 grams of acrylic resin (51% in 3:1 xylene/butanol) (BAYCRYL L 530-BASF) and 23.7 grams of melamine resin (MAPRENAL TTX-HOECHST-55% in butanol) are to be added, the batch briefly homogenized in a horizontal bead mill under shear and the resultant coating composition sprayed onto a metal sheet and stoved for 30 minutes at 130° C. The finish so obtained will exhibit a red shade of excellent fastness properties, with the enamel being distinguished by good flow properties and excellent dispersion of the pigment.

EXAMPLE 18

The following ingredients can be thoroughly milled for 96 hours in a ball mill:
25.2 g polyester resin, 60% in SOLVESSO 150, (DYNAPOL H700-DYNAMIT NOBEL)
2.7 g melamine resin, 55% in butanol, (MAPRENAL MF650-HOECHST)

15.5 g cellulose acetobutyrate (25% in xylene/butyl acetate 1:2)
1.1 g catalyst based on mineral oil/carboxylate (IRGASOL TZ6-CIBA-GEIGY AG)
23.3 g butyl acetate
11.6 g xylene
11.6 g SOLVESSO 150 (ESSO)
9.6 g the large particle size 2,9-dichloroquinacridone obtained according to Example 2

The coating resulting from diluting the pigment dispersion with a mixture of butyl acetate/xylene/SOLVESSO 150 (in the same proportions as shown above) to a viscosity of about 18 seconds (20° C.) according to DIN 4, subsequent spraying onto a metal sheet, and exposure to air for 2 minutes at about 40° C. can be further coated with a clear unpigmented top coat comprised of:

53.3 g acrylic resin, 60% in xylene (VIACRYL VC373-VIANORA)
27.3 g melamine resin, 55% in butanol, (MAPRENAL MF 590-HOECHST)
1.0 g SILICONE OIL A-1% in xylene (BAYER)
1.0 g benzotriazole derivative (TINUVIN 900-CIBA-GEIGY AG)
5.4 g xylene
4.0 g SOLVESSO 150 (ESSO)
3.0 g ethylene glycol acetate Exposure to air for 30 minutes at 40° C. and then stoving for 30 minutes at 135° C. will yield a red coating having excellent fastness properties.

EXAMPLE 19

This example illustrates the incorporation of the large particle size 2,9-dichloroquinacridone into high solids enamels.

Pigment Dispersion Formulation

A ½ pint can is charged with 24 grams of the pigment prepared according to Example 3, followed by 68.6 grams of acrylic resin and 57.5 grams of xylene. The mixture is agitated moderately with an impeller stirrer. The dispersion contains 16% pigment and 48% solids at a pigment to binder ratio of 0.5.

Catalyst and Stabilizer Solution Preparation

A gallon jar with an impeller stirrer is charged with 855 grams ethyl acetate, 2039 grams UV-screener solution and 33 grams of an amine solution (N-propylamine in xylene, methanol, butanol). A mixture of 47.0 grams methanol and 156 grams dodecyl benzenesulfonic acid is added and the resulting solution is stirred for 20 minutes.

Paint Formulation 33.4 grams of above described pigment dispersion, 38.2 grams of acrylic resin, 27.0 grams of melamine resin and 28.9 grams of catalyst and stabilizer solution are mixed and diluted with xylene to spray viscosity of 13–17 seconds using No. 4 FORD cup. The paint (masstone) is sprayed onto a primed aluminum panel exposed to ambient air for 10 minutes and stoved for 30 minutes at 130° C.

The red colored coating so obtained has excellent weatherability. FIG. 1 depicts the reflectance spectrum of the above described coating in comparison to a coating prepared in a similar manner but using the commercial small particle size γ-2,9-dichloroquinacridone (MONASTRAL Magenta RT-235-D) as pigment. The color is characterized by the following instrumental color readings obtained on a spectrophotometer using D65 illuminant, C.I.E. Lab-scale and 10 degree observer with specular component included; expressed in L, A, B color space values.

| Coating Containing | L | A | B |
|---|---|---|---|
| large particle size 2,9-dichloroquinacridone | 34.8 | 32.1 | 15.3 |
| commercial 2,9-dichloroquinacridone | 29.0 | 21.8 | 4.5 |

The above data demonstrate the color shade difference of the large particle size 2,9-dichloroquinacridone prepared according to the invention in a automotive coating system vs. the commercial pigment counterpart.

Summarizing, it is seen that this invention provides new application opportunities for large particle size 2,9-dichloroquinacridone. Variations may be made in proportions, procedures and materials without departing from the scope of the invention as defined by the following claims.

What is claimed is:

1. A process for pigmenting engineering plastic substrates and coatings comprising incorporating an effective pigmenting amount of 2,9-dichloroquinacridone having a specific surface area of below 30 m$^2$/g into said engineering plastic or coating.

2. The process of claim 1, wherein during said incorporation, said engineering plastic or coating is subjected to mechanical shear forces.

3. The process of claim 1, wherein said specific surface area ranges from 4–25 m$^2$/g.

4. The process of claim 1 which utilizes crude 2,9-dichloroquinacridone.

5. The process of claim 1, wherein said 2,9-dichloroquinacridone is treated with a polar solvent at elevated temperatures prior to incorporation into said engineering plastic or coating.

6. The process of claim 1, wherein said engineering plastic is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers and copolymers thereof.

7. The process of claim 1, wherein said 2,9-dichloroquinacridone is present in a concentration of from 0.1–30%, by weight.

8. The process of claim 1, wherein the resin component of said coatings is selected from the group consisting of acrylic, alkyd, epoxy, phenolic, melamine, urea, polyester, polyurethane, blocked isocyanate, benzoguanamine and cellulose ester resins, and mixtures thereof.

9. A composition comprising a high molecular weight organic material and 0.1–30%, by weight, of 2,9-dichloroquinacridone having a specific surface area lower than 30 m$^2$/g.

10. The composition of claim 9, wherein said specific surface area ranges from 4–25 m$^2$/g.

11. The composition of claim 9 which utilizes crude 2,9-dichloroquinacridone.

12. The composition of claim 9, wherein said 2,9-dichloroquinacridone is treated with a polar solvent at elevated temperatures prior to incorporation in said engineering plastic or coating.

13. The composition of claim 9, wherein said engineering plastic is selected from the group consisting of cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine/formaldehyde resins, urea/formaldehyde resins, epoxy resins and diene rubbers and copolymers thereof.

14. The composition of claim 9, wherein the resin component of said coatings is selected from the group consisting of acrylic, alkyd, epoxy, phenolic, melamine, urea, polyester, polyurethane, blocked isocyanate, benzoguanamine and cellulose ester resins, and mixtures thereof.

* * * * *